United States Patent
Goss et al.

(10) Patent No.: US 6,658,255 B1
(45) Date of Patent: *Dec. 2, 2003

(54) ENHANCED WIRELESS RADIO CHANNEL UTILIZATION

(75) Inventors: Stephen Clifford Goss, Wheaton, IL (US); Jeffrey Ross Light, Lincolnwood, IL (US); Chung-Zin Liu, Naperville, IL (US); Omar Hernando Salvador, Wheaton, IL (US); Gitesh P. Shah, Naperville, IL (US); Mark Kevin Stockert, Singapore (SG); Kenneth Wayne Strom, Naperville, IL (US); Charles Varvaro, Glendale Heights, IL (US); Randall Joe Wilson, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/517,687

(22) Filed: Mar. 2, 2000

(51) Int. Cl.[7] .................................................. H04Q 7/20
(52) U.S. Cl. ..................... 455/450; 455/62; 455/509; 455/510; 455/514; 455/528; 370/328; 370/329; 370/437; 379/266.06
(58) Field of Search .......................... 455/450, 62, 509, 455/510, 514, 528, 500; 370/328, 329, 338, 431, 437, 485; 379/266.06

(56) References Cited

U.S. PATENT DOCUMENTS

| | | | |
|---|---|---|---|
| 4,788,715 A | | 11/1988 | Lee .............................. 379/84 |
| 4,953,204 A | | 8/1990 | Cuschleg, Jr. et al. ...... 379/266 |
| 5,260,993 A | * | 11/1993 | Breeden et al. .............. 455/465 |
| 5,311,574 A | * | 5/1994 | Livanos ........................ 379/88 |
| 5,311,583 A | * | 5/1994 | Friedes et al. ............... 379/209 |
| 5,734,678 A | * | 3/1998 | Paneth et al. ................ 375/240 |
| 5,794,156 A | * | 8/1998 | Alanara ........................ 455/517 |
| 5,805,666 A | * | 9/1998 | Ishizuka et al. ................ 379/1 |
| 6,049,547 A | * | 4/2000 | Fisher et al. ................. 370/412 |
| 6,069,882 A | * | 5/2000 | Zellner et al. ............... 370/329 |
| 6,130,942 A | * | 10/2000 | Stenlund ..................... 379/265 |
| 6,510,162 B1 | * | 1/2003 | Fijolek et al. ............... 370/432 |
| 6,526,281 B1 | * | 2/2003 | Gorsuch et al. .......... 455/452.1 |
| 2002/0193119 A1 | * | 12/2002 | Goss et al. .................. 455/453 |

* cited by examiner

*Primary Examiner*—William Trost
*Assistant Examiner*—Danh Le

(57) ABSTRACT

Apparatus and a method for establishing a cellular mobile call. If no radio traffic (voice or data) channels are available for a calling or called mobile station (MS), then a test is made to determine the expected wait time before a channel becomes available. If the expected wait time is less than a first threshold, then the call or the call request is queued. If a channel for an incoming call to an MS does not become available before a second time threshold, then the caller is notified by an announcement that the call has been queued and is expected to be established in a short time. If the caller of an incoming call to the MS does not disconnect, then the MSC waits for an available channel and establishes a connection to the MS over that available channel. For an outgoing call from an MS, a control message is sent to the MS to trigger an indication of the queued status to the user. The indication may be one or more tones, a data display, or the playing of a pre-recorded announcement. Advantageously, the number of calls blocked because of unavailable traffic channels is reduced. Advantageously, the same arrangement can be used to reduce blocking of calls because of unavailability of trunks for a link of a call connection.

24 Claims, 3 Drawing Sheets

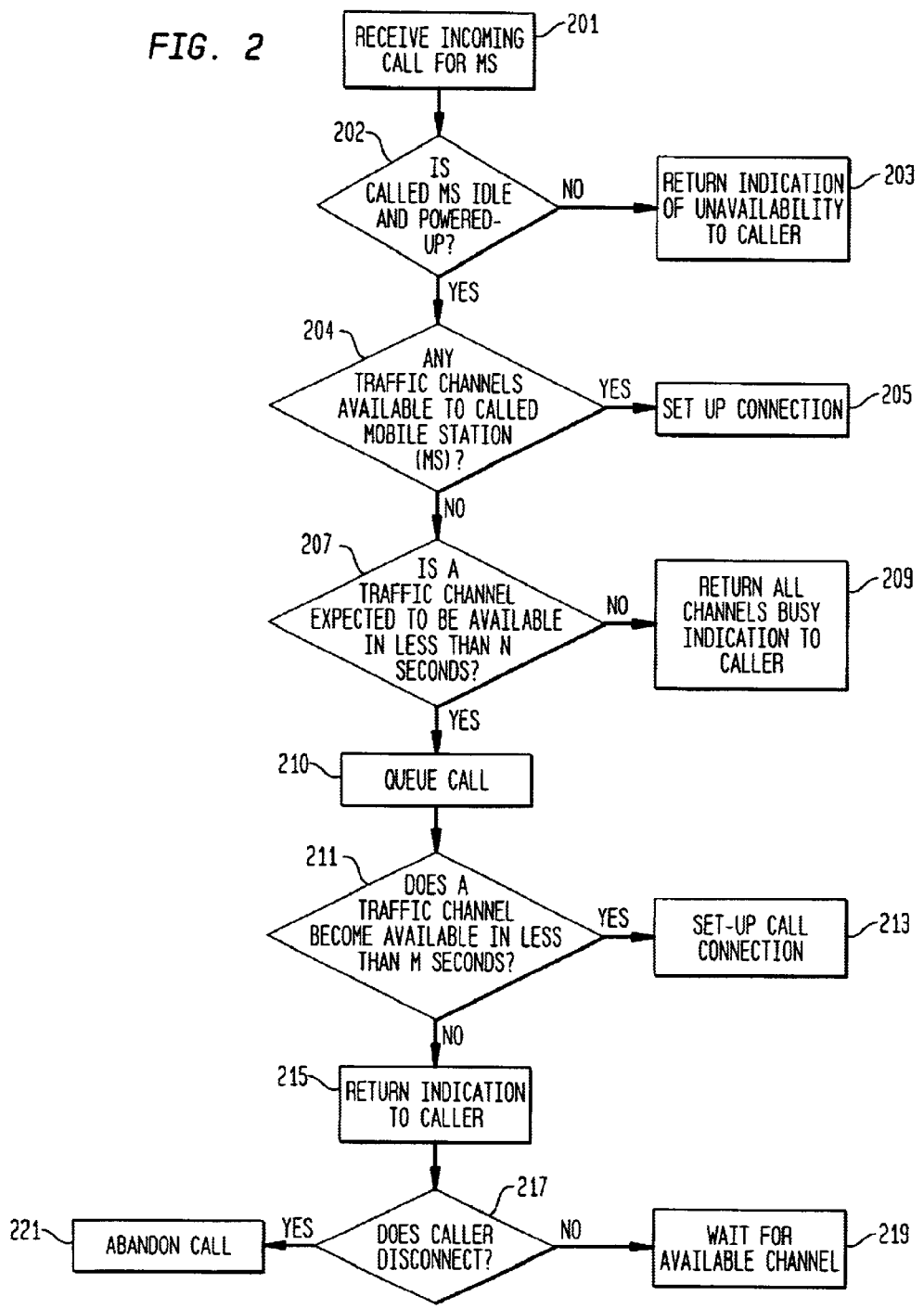

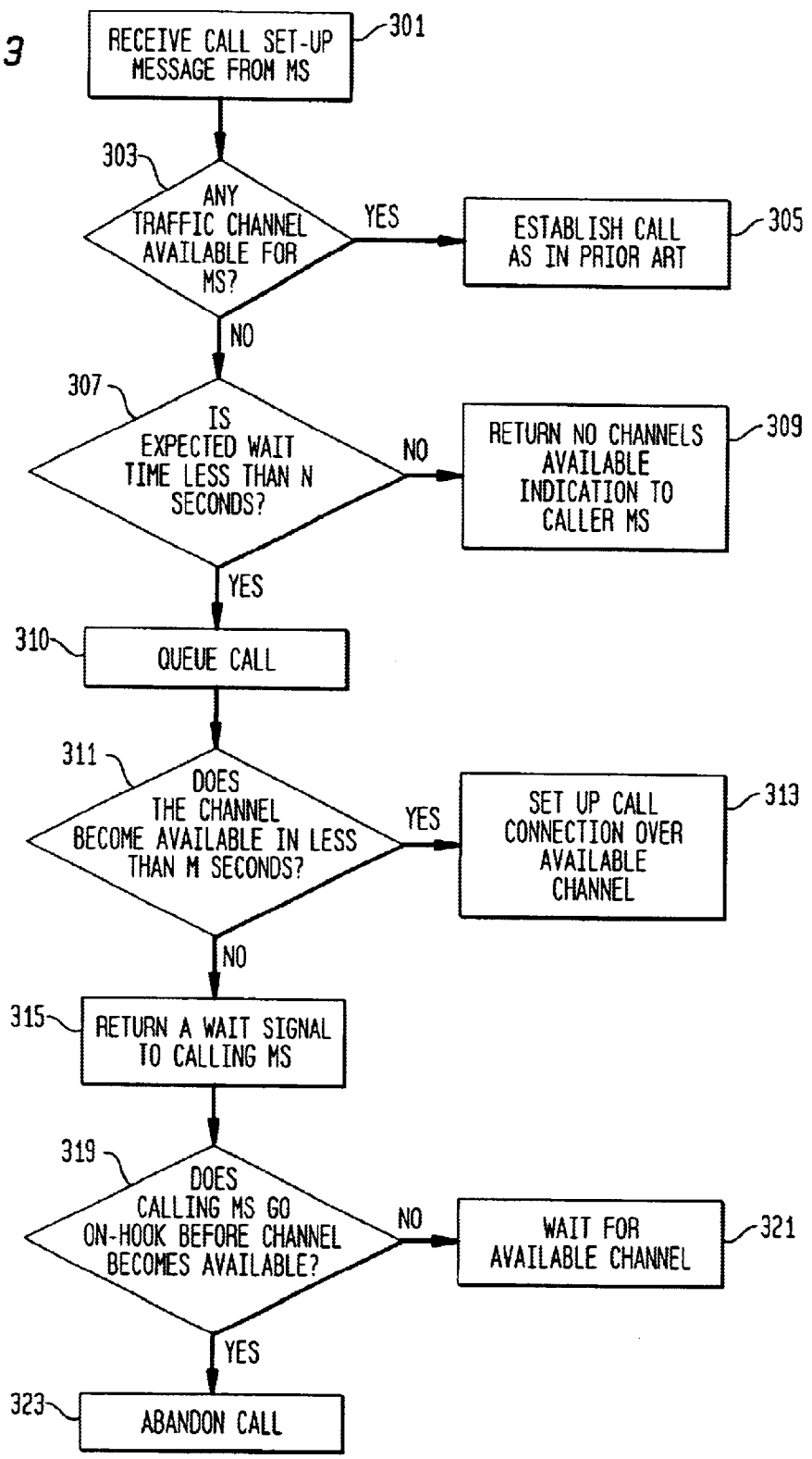

ENHANCED WIRELESS RADIO CHANNEL UTILIZATION

RELATED APPLICATION

This Application is related to an Application entitled, "Improved Human Interface for Wireless Telephone Stations", being filed concurrently by the same inventor, and being assigned to the same Assignee.

TECHNICAL FIELD

This invention relates to the utilization of traffic channels in a cellular wireless telecommunications system.

PROBLEM

In a cellular wireless telecommunications system, the final stage of a connection to a mobile station (MS) involves the use of a radio channel, a traffic (voice or data) channel from a base station, connected to a host controller such as a mobile switching center (MSC). The number of traffic channels available from any base station is limited by a number of factors dependent upon the specific radio technology used and the allotted bandwidth of the base station. In some cases, if all the traffic channels at a preferred base station capable of receiving the signal from the MS are occupied, an alternate base station having available channels can serve the call. However, if this is not the case, the call cannot be set up, and is effectively blocked.

Mobile stations also communicate with their host controller, such as a controlling mobile switching center (MSC) by a control radio channel, which is available even if no voice radio channels are available. Thus, it is possible to signal a mobile station to inform it that it cannot originate a call because no traffic channels are available.

Even though in many or most cases, the number of traffic channels available is adequate for handling the required traffic, there are cases in which sudden peaks of traffic exceed the capabilities of the radio system. For example, if a large airplane lands at an airport, many of the passengers immediately try to make a cellular call, (in part because the pay telephones are also busy). Under those circumstances, if a particular mobile station cannot get a traffic channel, the mobile station keeps sending set-up messages (typically when the user presses the end and then the send buttons), thus flooding the MSC with an excessive number of requests, and possibly creating processing load problems for the MSC.

A problem with the prior art, therefore, is that there is no way of smoothing the traffic load if the number of radio channels is inadequate at a particular time.

While queuing for a traffic channel is one important problem, a similar class of problems exits for queuing for a call transmission resource, such as a trunk in a public network. Queuing for trunks is known for private networks, such as those used to complete 800 calls for companies that have a plurality of automatic call distributors in geographically diverse locations and that queue calls for completion to one of these distributors. However, there is no known arrangement for queuing calls in a public network.

SOLUTION

Applicants have carefully studied this problem, and have recognized that the number of traffic channels available in most cellular systems for accessing a particular mobile station is generally large. If all of these traffic channels are busy, the likelihood that one will become available in a short time, or even that a small number of traffic channels will become available in a short time, is substantial. Therefore, in accordance with Applicants' invention, when no traffic channels are available, a limited number of mobile stations can be queued up for outgoing calls, and/or a limited number of incoming calls can be queued up for completion to idle mobile stations that are currently inaccessible because of the unavailability of a traffic channel.

In accordance with Applicants' invention, if a call set-up message is received by a host controller such as a mobile switching center (MSC) and no traffic channel is available, the MSC tests whether the expected delay until a traffic channel becomes available is less than some parameter, say N seconds; if not, then the mobile station is informed of the unavailability of radio channels in accordance with the principles of the prior art. If a channel is expected to be available in less than N seconds, the MSC simply waits and tries to set up a connection to the MS when a channel becomes available. If the elapsed time exceeds M seconds and no traffic channel has become available, the caller is notified and, effectively, has the choice of either waiting longer until a traffic channel is available, or disconnecting and abandoning the call. The notification of the caller can be made by a message sent over the control channel which, in the MS, results in a displayed message; or the generation of a tone or a tone cadence; or inventively, in the generation of a message for triggering an announcement. The latter choice has the advantage over a display, because the caller will probably have the MS up to his/her ear, and therefore will not see the display.

In accordance with Applicants' invention, incoming calls can also be queued up. If an incoming call is received when no traffic channels are available to the called MS, then a test is performed to determine whether the expected wait time before a traffic channel becomes available is less than N seconds. If not, the caller receives an "all radio channels busy" indication, as in the prior art. If the expected wait time is less than N seconds, then the MSC waits for an available traffic channel. If the waiting time exceeds M seconds, then a pre-recorded announcement, display message, or tone is sent to the caller indicating that the network expects to be able to complete the call shortly, or in approximately P seconds. If the caller does not disconnect, the connection to the called MS is established when a traffic channel becomes available. If the caller disconnects, the call is abandoned.

Advantageously, this arrangement allows for a significant decrease in the number of calls blocked because of unavailability of a traffic channel. Advantageously, this type of arrangement for outgoing calls may significantly alleviate the problem of callers repeatedly sending set-up messages when no traffic channels are available.

For other applications, such as routing long distance calls through a network when a call is initially blocked because no trunk is available for one link of the call, the same queuing arrangement can be used to queue calls waiting for the availability of a trunk. Advantageously, this arrangement can be used to reduce blocking during periods of heavy traffic.

BRIEF DESCRIPTION OF THE DRAWING(S)

FIG. 2 illustrates the processing of an incoming call; and

FIG. 3 illustrates the processing of an outgoing call.

DETAILED DESCRIPTION

Figure 1:
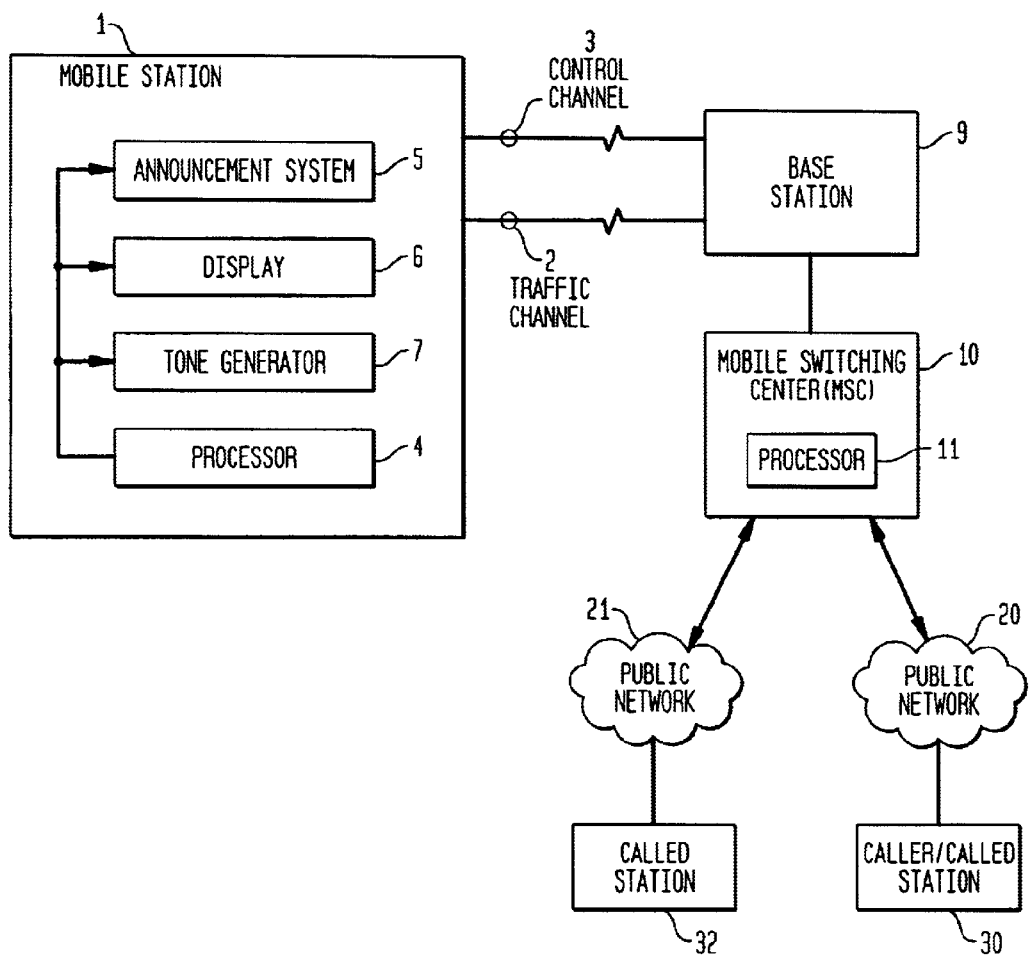
FIG. 1 is a block diagram, illustrating the operation of Applicants' invention.

FIG. 1 is a block diagram showing a mobile station 1, a base station 9, and a host controller, in this case a mobile switching center (MSC) 10. The MSC is connected via public network 20 to a caller/called station 30. Clearly, the caller/called station 30 can also be a mobile station or a land-line station. The mobile station is connected to a base station via a radio traffic (voice or data) channel 2, and a radio control channel 3. Even if no traffic channels are available, messages can be sent over the control channel.

The mobile station 1 includes a processor 4, such as a microprocessor, and three possible means to indicate to a caller that the caller should wait before disconnecting, while the MSC is waiting for an available traffic channel. One possible indicator is a tone generator 7 for generating single or cadenced tones; prior art MSs are already equipped with tone generators for generating tones for transmission over a traffic channel to access, for example, a bank account database. Another possible indicator is a display 6 of a modest number of characters available on prior art MSs. A disadvantage of using the display, is that users normally hold their phones to their ears while making a call. A tone can accompany a display, and the users can be trained to look at the display when they hear the tone. A third possible indicator in the MS, in accordance with this invention, is an announcement system 5, which responds to an appropriate message or set of messages received over the control channel by generating a pre-recorded voice announcement. For example, the voice announcement might say, "Please wait another 10 seconds for the system to set-up your call". For the latter indicator, one or more control messages from the MSC request the playing of a selected one or more of a plurality of pre-recorded announcements by a pre-recorded announcement system.

The mobile switching center 10, includes a processor 11 for queuing incoming calls and queuing requests to make outgoing calls. If both queues are active and a channel becomes available, several strategies are possible, and the choice would be under the control of the service provider.

1. Select from the incoming call queue first, (because other resources have already been allocated for the call).
2. Select from the outgoing call queue first.
3. Alternate queues.
4. Select at random between the incoming and outgoing queues.
5. Select the call that has been waiting the longest time.

FIG. 2 is a flow diagram, illustrating the processing of an incoming call for the MS. An incoming call is received at the MSC, (Action Block 201). The MSC tests whether the called MS is idle and powered-up, (Test 202). The test can include a test of whether the signal strength from the MS is adequate, and a treatment of unavailable, if it is not. It is also possible to use a different threshold for signal strength prior to queuing the call in case no radio channel is available. If the MS is not powered-up or is not idle, an indication is returned to the caller to indicate that the called party is busy or unavailable, (Action Block 203). If the called party is available and powered-up, the MSC tests whether any traffic channels to the called MS are available, (Test 204). If so, then the MSC sets up a call connection, (Action Block 205), in accordance with the principles of the prior art. If not, then the MSC tests whether a channel is expected to be available in less than N seconds, (Action Block 207). If not, then "all channels busy" indication is returned to the caller, (Action Block 209). If the expected wait time is less than N seconds, then the call is queued, (Action Block 210). If a channel becomes available for the incoming call in less than M seconds, (Test 211), then the call connection is established, (Action Block 213). If no channel becomes available within M seconds, then an indication such as an announcement, is returned to the caller, (Action Block 215), indicating that the system expects to be able to establish a connection shortly. Test 217 is used to determine whether the caller disconnects. If not, the MSC waits for an available channel, (Action Block 219), and when that channel is available, sets up a call connection to the called MS, (Action Block 213). If the caller disconnects, the call is abandoned and the active resources of the call are released, (Action Block 221). In alternate embodiments, it is also possible to send status messages with queuing options to the caller.

FIG. 3 is a flow diagram illustrating the operation of an outgoing call from an MS. The MSC receives a call set-up message from the calling MS, (Action Block 301). The MSC then tests whether a traffic channel is available for the calling MS, (Test 303). If so, then the call is established as in the prior art, (Action Block 305). If not, the MSC tests whether the expected wait time for a channel is less than N seconds, (Test 307). If not, then a "no channels available" indication is returned to the calling MS, (Action Block 309). If the expected wait time is less than N seconds, the call is queued, (Action Block 310). Then,Test 311 determines whether or not a channel becomes available in less than M seconds. If so, then the call connection is set up over the available channel, (Action Block 313). If no channel becomes available in M seconds, then a wait signal is returned to the caller MS, (Action Block 315). The wait signal can be an announcement indicating that an expected wait time of P seconds is likely to be encountered. Test 319 determines whether the calling MS goes on-hook before a channel becomes available. If so, the call is abandoned, (Action Block 321). Otherwise, the MSC waits for an available channel, (Action Block 323), and when that channel becomes available, sets up a connection over the available channel, (Action Block 313).

It may be desirable to have a longer expected wait time threshold N, but to inform the caller after a shorter interval of time M, so that the caller does not feel abandoned. The choice of M, N, and P is likely to be determined by field experience, and may be subject to the preferences of a particular carrier. Also, different values of M and N can be selected for incoming and outgoing calls.

An alternative embodiment of the principles of Applicants' invention, as illustrated in FIGS. 1 and 2, can be used to complete calls that appear initially blocked because no trunk is available for a link of a connection from a caller to a called party. In this embodiment as shown in FIG. 1, a calling station 30 is requesting a connection to a called station 32 via a public network segment 20 and another public network segment 21. No trunks are available for a link of the connection that passes through switch 10 which can be, for this alternative embodiment, a land-line switching system. This switching system takes over the role of the mobile switching center for steps 201, 204, 205, 207, 209, 210, 211, 213, 215, 217, 219, 221, and the word "trunk" is substituted for "traffic channel" or "channel", and the words "mobile station" are deleted. For this embodiment, the calling station 30 may be directly connected to the switch 10, which does not have an available outgoing trunk.

The above description is of one preferred embodiment of Applicants' invention. Other embodiments will be apparent to those of ordinary skill in the art. The application is limited only by the attached Claims.

What is claimed is:

1. In a mobile cellular switching network, a method of establishing a radio link of a cellular call, comprising the steps of:

if a traffic channel for a mobile station (MS) is available, establishing said radio link over the available channel;

if no channel is available, testing whether the expected wait time until a channel becomes available exceeds a first threshold;

if the expected wait time does not exceed said first threshold, waiting until a channel becomes available; and establishing said radio link over the channel that became available.

2. The method of claim 1, wherein said radio link is for an originating call from said MS.

3. The method of claim 2, further comprising the step of:

if no channel becomes available prior to the lapse of a second time threshold, informing a caller of said call of a current state of said call by sending a control message over a control channel to said MS.

4. The method of clam 3, wherein the step of informing comprises the step of sending a control message to said MS for causing said MS to generate at least one tone.

5. The method of claim 3, wherein the step of informing comprises the step of sending a control message to said MS, said control message for causing said MS to generate a display.

6. The method of claim 5, wherein the step of generating a control message comprises the step of generating a control message providing an indication of an amount of expected further delay.

7. The method of claim 3, wherein the step of informing comprises the step of sending a control message for causing said MS to generate at least one tone and a display message.

8. The method of claim 3, wherein the step of informing comprises the step of sending a control message to said MS for causing said MS to generate a pre-recorded announcement, wherein said MS has apparatus for generating pre-recorded announcements.

9. The method of claim 8, wherein the step of generating an announcement comprises the step of generating an announcement providing an indication of an amount of expected further delay.

10. The method of claim 1, wherein said radio link is for an incoming call to said MS.

11. The method of claim 10, further comprising the step of if no channel becomes available prior to the lapse of the second time threshold, informing a caller of said call so that said caller may continue to wait or may abandon the call.

12. The method of claim 11, wherein the step of informing comprises the step of transmitting an announcement from a mobile switching center serving said mobile station (MS) to said caller.

13. In a mobile cellular switching network, apparatus for establishing a radio link of a cellular call comprising:

a host controller for serving a mobile station (MS), and for selecting a traffic channel for communicating with said MS;

said host controller controlling establishment of a traffic link to said MS if a traffic channel to said MS is available;

said host controller upon determining that no channel is available, testing whether the expected wait time until a channel becomes available exceeds a first threshold;

said host controller waiting until a channel becomes available, if the expected wait time does not exceed said first threshold; and said host controller establishing said radio link over a channel that becomes available.

14. The apparatus of claim 13, wherein said radio link is for an originating call from sad MS.

15. The apparatus of claim 14, wherein said host controller is further adapted to transmit at least one control message over a control channel to said MS if no channel becomes available prior to the lapse of a second time threshold.

16. The apparatus of claim 15, wherein said at least one control message is for causing said MS to generate at least one tone.

17. The apparatus of claim 15, wherein said at least one control message is for causing said MS to generate a display.

18. The apparatus of claim 17, wherein said at least one control message provides an indication of an amount of expected further delay.

19. The apparatus of claim 15, wherein said at least one control message is for causing said MS to generate at least one tone, and a display.

20. The apparatus of claim 15, wherein said mobile station further comprises means for generating pre-recorded announcements, and wherein said at least one control message is for generating a pre-recorded announcement.

21. The apparatus of claim 20, wherein said pre-recorded announcement is further enhanced with an indication of an amount of further delay.

22. The apparatus o f claim 13, wherein said radio link if for an incoming call destined for said MS.

23. The apparatus of claim 22, wherein said host controller is further adapted to inform a caller if no channel becomes available prior to the lapse of a second time threshold.

24. The apparatus of claim 23, wherein said host controller is adapted to control the provision of an announcement to said caller.

* * * * *